F. MEYER.
MEANS FOR DETACHING POSTAGE STAMPS, LABELS, AND THE LIKE FROM SHEETS
AND ATTACHING SAME TO ANY DESIRED OBJECT OR MATTER.
APPLICATION FILED JUNE 1, 1908.

954,321.

Patented Apr. 5, 1910.

5 SHEETS—SHEET 1.

Witnesses:

Inventor:
Frederick Meyer
by his attorney

F. MEYER.
MEANS FOR DETACHING POSTAGE STAMPS, LABELS, AND THE LIKE FROM SHEETS AND ATTACHING SAME TO ANY DESIRED OBJECT OR MATTER.
APPLICATION FILED JUNE 1, 1908.
954,321.
Patented Apr. 5, 1910.
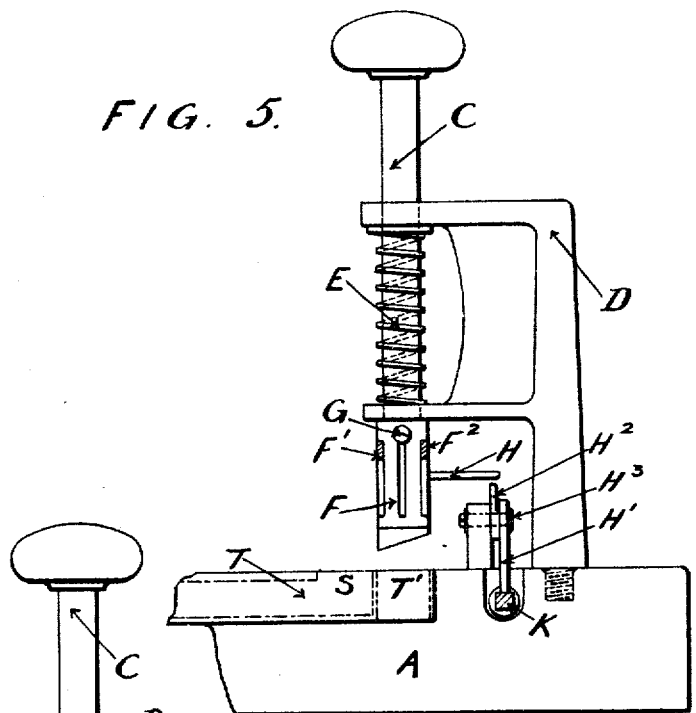
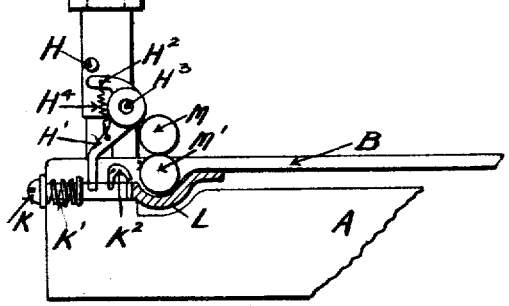

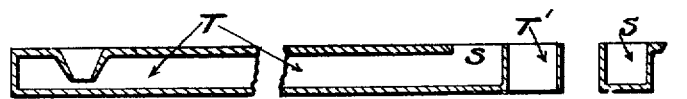
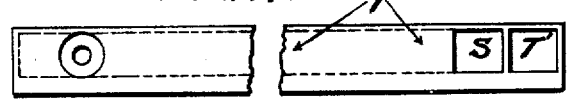
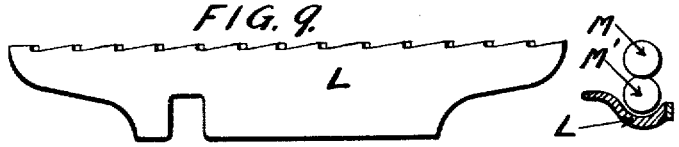
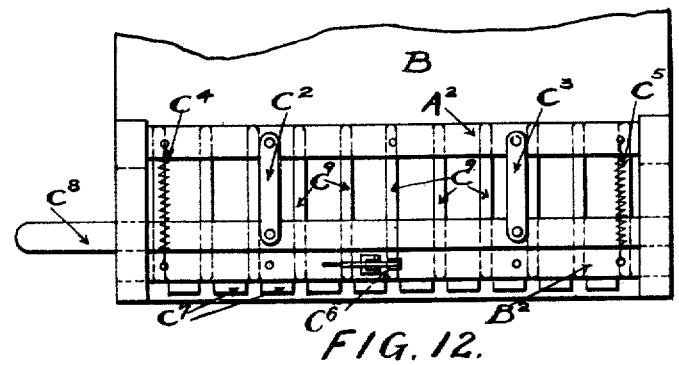
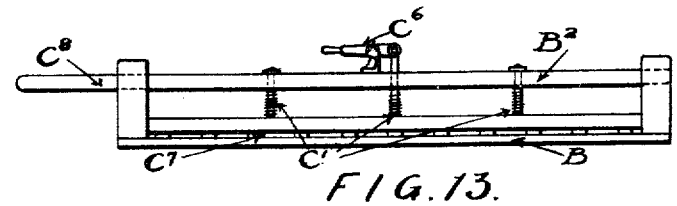
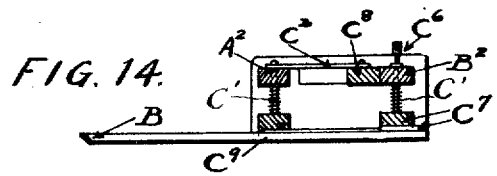

F. MEYER.
MEANS FOR DETACHING POSTAGE STAMPS, LABELS, AND THE LIKE FROM SHEETS AND ATTACHING SAME TO ANY DESIRED OBJECT OR MATTER.
APPLICATION FILED JUNE 1, 1908.

954,321.

Patented Apr. 5, 1910.
5 SHEETS—SHEET 4.

Witnesses:
Inventor:
Frederick Meyer

F. MEYER.
MEANS FOR DETACHING POSTAGE STAMPS, LABELS, AND THE LIKE FROM SHEETS
AND ATTACHING SAME TO ANY DESIRED OBJECT OR MATTER.
APPLICATION FILED JUNE 1, 1908.

954,321. Patented Apr. 5, 1910.
5 SHEETS—SHEET 5.

UNITED STATES PATENT OFFICE.

FREDERICK MEYER, OF LIVERPOOL, ENGLAND.

MEANS FOR DETACHING POSTAGE-STAMPS, LABELS, AND THE LIKE FROM SHEETS AND ATTACHING SAME TO ANY DESIRED OBJECT OR MATTER.

954,321.      Specification of Letters Patent.      Patented Apr. 5, 1910.

Application filed June 1, 1908. Serial No. 435,981.

*To all whom it may concern:*

Be it known that I, FREDERICK MEYER, a subject of the King of Great Britain and Ireland, residing at Liverpool, in England, have invented a new and useful improvement in means for detaching postage-stamps, labels, or the like from sheets and attaching the same to any desired object or matter, of which the following is a specification.

The object of my invention is to effect in an improved manner the separation or detachment of postage stamps, labels or the like from sheets and their attachment if required to postal matter or to any desired article, and the invention consists in an improved machine of the kind having a movable or traveling table fitted with a device for feeding the sheet of postage stamps, labels or the like hereinafter termed the sheet toward the knife or knives used for separating the stamps, labels or the like from the sheet.

The sheet is fed toward special knives, which are placed in a suitable position and are actuated by means of a vertical stamping rod. These special knives after cutting the perforated edges of the stamp, label or the like which connect it to the sheet, are arrested on their downward stroke at a given point, thus allowing the stamping rod to complete its stroke, and attach the severed stamp or the like to the postal or other matter to be treated. The severed stamps or the like are caused to adhere to the matter to be treated by means of a moistening medium over which they are made to pass on their way to the knives. The sheet is fed toward the knives always on the upward stroke of the stamping rod.

Figure 1:
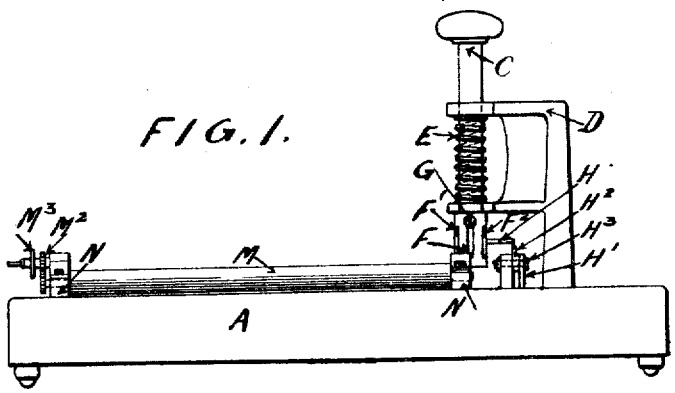
Figure 2:
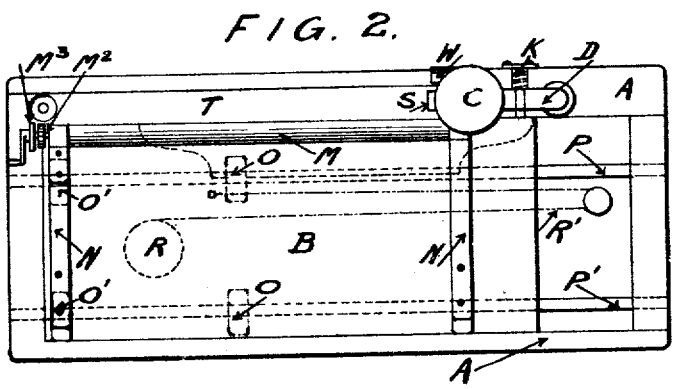
Figures 3, 4:
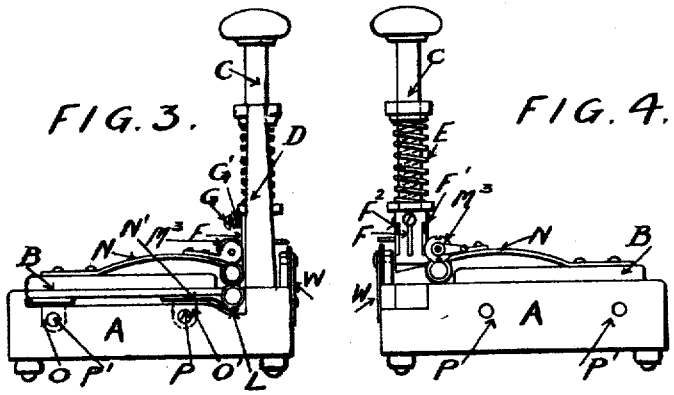
Figure 15:
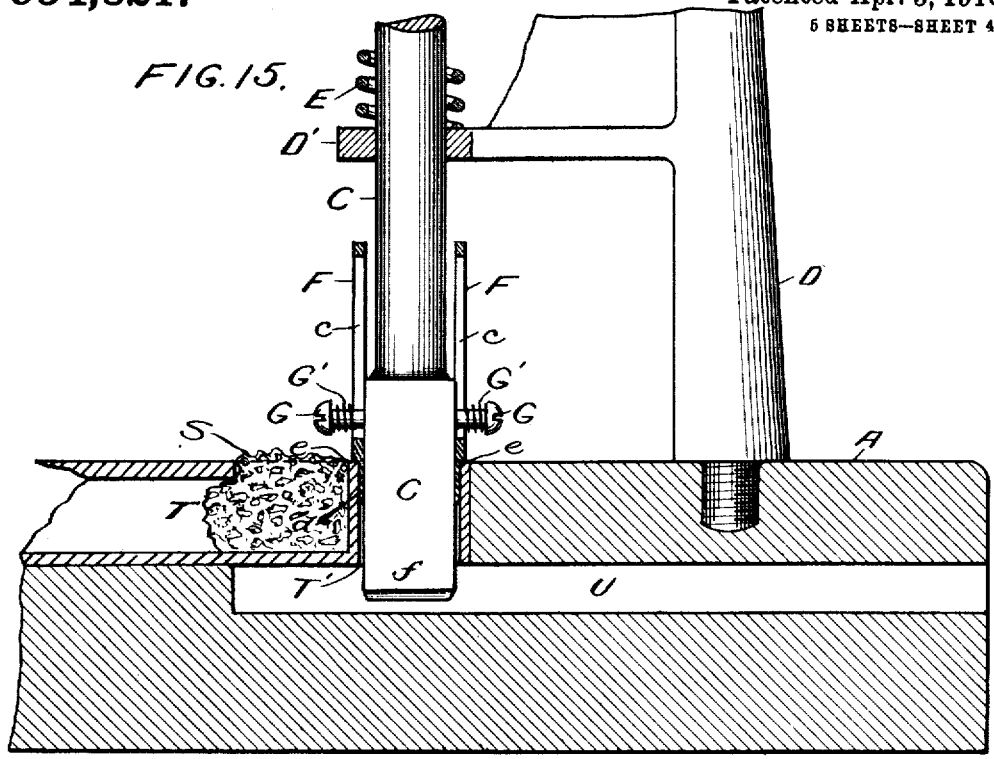
Figure 16:
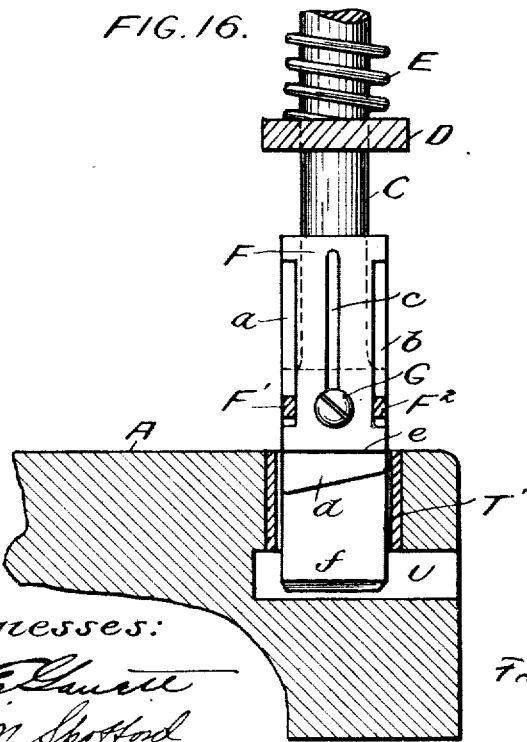
Figure 17:
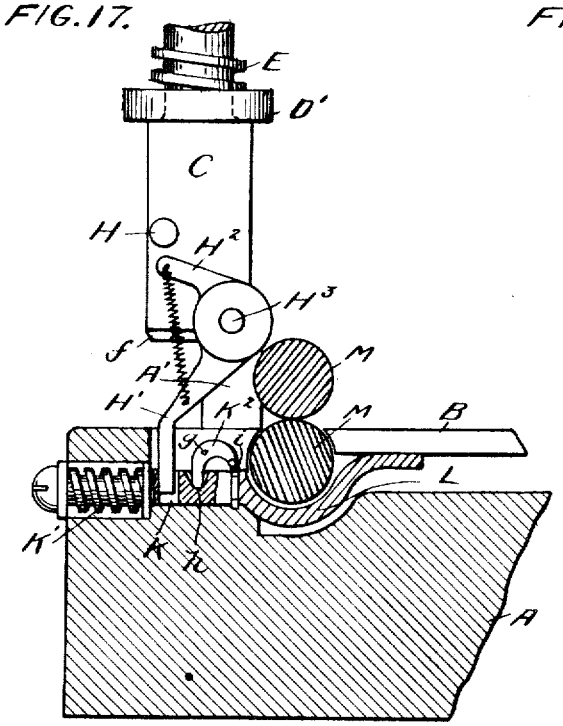
Figure 18:
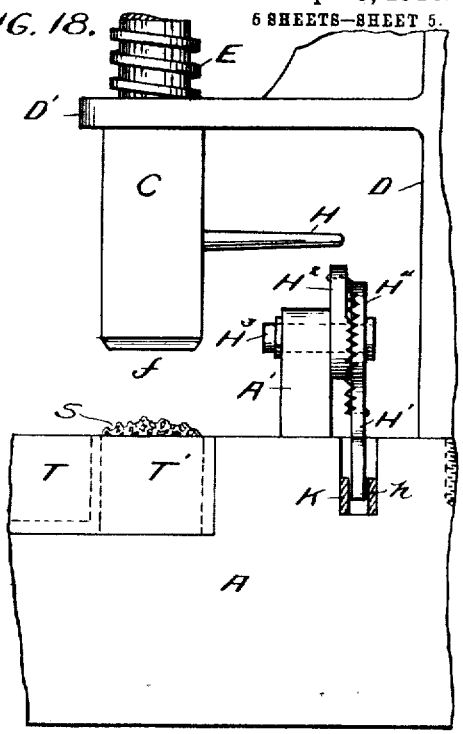
Figure 19:
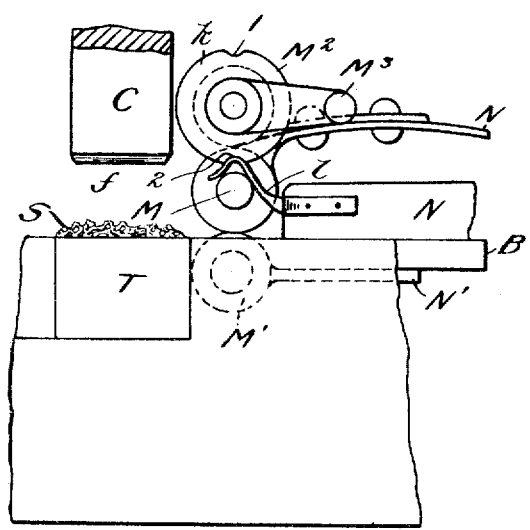
Figure 20:
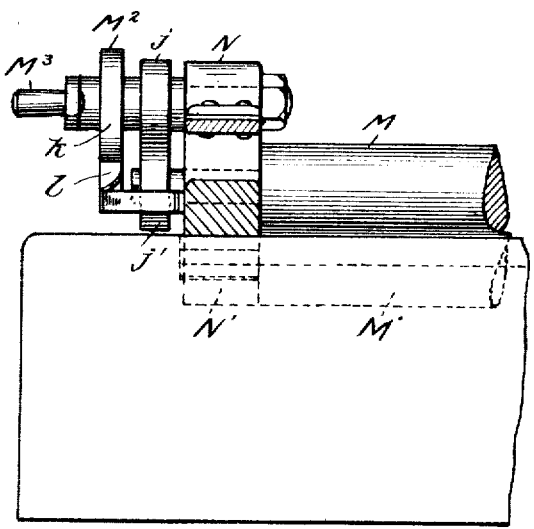

In the accompanying drawings Figure 1 is a front elevation of my improved machine; Fig. 2 is a plan of the same; Figs. 3 and 4 are end elevations thereof showing its respective ends; Fig. 5 represents a portion of Fig. 1 on a larger scale and partly in section; Fig. 6 is another enlarged view partly in section in a plane at right angles to that of Fig. 5; Figs. 7, 8 and 9 are respectively a sectional elevation, a sectional end elevation and a plan of the trough; Figs. 10 and 11 are respectively a plan and a sectional end elevation of the rack, the latter showing a superposed pair of rolls; Figs. 12, 13 and 14 are respectively a plan, a front elevation and a sectional end view showing a sheet feeding device of the "parallel rule" type. Figs. 15 and 16 are fragmentary sectional detail views on a still larger scale as compared with Figs. 5 and 6 showing the knives and their appurtenances and illustrating the operation of the stamping rod more clearly; Figs. 17 and 18 are fragmentary sectional detail views on the same scale as Figs. 15 and 16 showing more clearly the feed controlling escapement hereinafter described; and Figs. 19 and 20 are fragmentary detail views on the same scale as Figs. 15 to 18 inclusive, showing more clearly the feed controlling stop gearing hereinafter described.

Similar reference characters refer to similar parts in all the figures.

My machine can be made of any desired shape and constructed of any suitable material, and includes a frame, A, containing a horizontally traveling or sliding carriage, B. Supported by the frame or stationary part A is a vertical stamping rod, C, which reciprocates through fixedly located guides or brackets, D. Such guides or brackets can be cast or otherwise made fast upon the frame A. Upon the sides of this stamping rod C, at the desired position is or are attached one or more knives F. These knives are made of any desired shape and thickness, with edge notches $a$ and $b$ and slots $c$, Figs. 15 and 16, cut therein to interact respectively with guides F' and F² and attaching screws G. The knife or each knife is reduced at one end to form a cutting edge, $d$, and shoulder $e$, Figs. 15 and 16, the angle of the cutting edge being suitable for readily detaching or severing stamps, labels or the like from the sheet; and by means of springs, G', Fig. 15, embracing said screws G, these knives can be adjusted to the necessary amount of friction required to detach the stamps, labels or the like from the sheet, the shoulder $e$ formed on each of these knives being the means of arresting the travel of the knife, without its being carried through the whole length of stroke made by the stamping rod C. The knives F, after detaching a stamp, label, or the like are arrested by means of the shoulder $e$ above referred to, coming in contact with the top of the walls of an aperture, T', in the trough T, and by means of said notches $a$ and $b$ and slots $c$, the stamping rod C is permitted to complete its full stroke, by means of which the stamp, label or the like is carried down after detachment from the sheet, and placed on or attached to the postal matter or any desired object. Compare Figs. 15 and 16 with Fig. 5.

At the extremity of the vertical stamping rod C can be fitted a pad $f$, Figs. 15–19, of suitable material to adapt itself to any irregular surface. A spring E is fitted to the stamping rod C for automatically bringing it back into position after being pressed down for detaching a stamp, label or the like from the sheet. When the stamping rod C is thus reëlevated the upper ends of the knives F come into contact with an overhanging frame part (D′, Figs. 15-18) and are restored to their effective position best shown in Fig. 5. Compare Figs. 5 and 16. At a given position on the stamping rod C, I have a pin, H, projecting horizontally a certain distance; and suitably arranged upon the stationary frame A and fixedly attached thereto by means of a bracket or boss, A′, Figs. 17 and 18, I have levers, H′ and H², working upon a horizontal pin or spindle, H³, and connected together by means of a spring, H⁴. The lever H′ is so shaped that its lower end works in a slot of a subjacent pin or bolt, K, which engages a rack, L, attached to the carriage B. The lever H² is shaped and arranged to interact with said pin H. During each downward stroke of the stamping rod C said pin H turns the shaped lever H² on said spindle H³, until the pin passes the end of the lever, when the lever springs back (but owing to the spring does not move the lever H′). Upon its upward stroke the pin H catches the lever H² and causes a sudden movement of the lever H′ (owing to the spring connecting the two levers), which movement is sufficient to push back the bolt K, enough to allow one or more of the teeth of said rack L to pass at each actuation; a spring, R, Fig. 2, serving to move the carriage in the right direction. On said bolt K, I have a spring, K′, which automatically brings the bolt K back to its proper position, thus keeping the rack L and carriage B in position until the vertical stamping rod C is again pressed down. A safety pawl, K², for the rack L is made of a desired shape, as for instance like the letter U upside down, and works upon an appropriately located horizontal fulcrum, $g$, Fig. 17. One end of the pawl K² is placed within a recess $h$, formed in the bolt K, and when the bolt K is moved by the lever H′ it turns said pawl K² on its fulcrum, and this forces the nose end $i$, Fig. 17, of the pawl K² down between two of the teeth of the rack L, and prevents the carriage from running beyond its proper position. Compare Figs. 6, 10, 11 and 17.

On the stationary frame A is placed a trough, T, Figs. 5, 6 and 8, fitted with a suitable moistening medium, which may consist of sponge or any suitable material, and constructed with a suitably located aperture S in its top for exposing said medium. By this means water or the like may be conveyed to the postage stamp, label or the like under operation. This trough is so constructed that the fluid does not readily spill when in operation, and its position on the frame A is such that each stamp, label or the like is moistened just immediately before being detached or severed from the sheet and attached to the postal matter or any desired object or material, either by passing over the moistening medium or by an automatic application of the moistening material thereto. In said trough T and immediately under the vertical stamping rod C, an aperture T′ is formed, to allow the end of said stamping rod C, carrying the detached or severed stamp, label or the like, to pass through as in Figs. 15 and 16, and attach the same to the postal matter or other object or material.

A convenient space, U, Figs. 15 and 16, is left in the frame A under the stamping rod C to receive the postal matter or other object or material. The carriage B is made of suitable size to deal with the sheet of stamps, labels or the like, and is provided on its under side with suitable brackets, O and O′, for sliding upon rods, P and P′, which are attached to the frame A; or the carriage may be made to slide or travel in grooves, or any other suitable method may be employed.

Upon the carriage B, I have arranged two rolls, M and M′, of suitable material mounted in suitable brackets, N and N′. These brackets can be made to spring, so that they have sufficient force to press the rolls together, but can be separated sufficiently to introduce the sheet of stamps, labels or the like, between the rolls.

The rolls M and M′ are used for feeding the sheet toward and under the knife or knives F of the vertical stamping rod C; and such feed is gaged and controlled by said rolls being fitted at one end with suitable stop gearing, M², operated by a hand crank, M³, and accurately cut and set to rotate the rolls sufficiently to bring into position the next row of stamps, labels or the like, after a preceding row is finished. Said stop gearing as shown in Figs. 19 and 20 is composed of a pair of small wheels, $j$ and $j'$, which transmit motion from the shaft of the hand crank M³ to that of the upper feed roll M, a stop wheel, $k$, on the hand crank shaft having a pair of diametrically opposite peripheral stop notches, 1 and 2, and a stop spring, $l$, arranged to interlock with said stop notches successively and to stop the feed at the end of each half turn of the hand crank; the parts being so proportioned that each half turn brings a fresh row of stamps into position.

The shanks of the upper roll supporting brackets N are extended across the table B parallel with each other as shown in Fig. 2, and operate as edge guides to prevent the sheet from turning thereon in case the grip of the rolls M and M' on the sheet is imperfect owing to a lump of gum or for any other reason.

The rack L is attached to the underside of the carriage B, and its teeth are made suitable for allowing the carriage to move the required distance. For different sizes of stamps, labels or the like separate racks will be required.

The spring R continually exerts a sufficient pressure for moving the carriage B in the right direction. This spring R can be made of any suitable design, and connected to the most desirable part. The drawings represent a spring such as is used upon a typewriter, or like machine, having a chain, R', working over a guide pulley to pull the carriage B in the desired direction, upon the bolt K being drawn back from the teeth of the rack L, by means of the stamping rod C, as above described.

Attached to the stationary frame A are other levers, W, Figs. 2, 3 and 4, so constructed and formed that by the action of the vertical stamping rod returning on its upward stroke, these levers are set in motion and automatically throw or kick out the letter or other matter immediately after being stamped or labeled. These levers are constructed in like manner to the levers H' and H², which retract the escapement bolt K in the feed movement of the carriage B, and are worked in the same manner by means of a pin carried by the vertical stamping rod at a desired position, and projecting a certain distance to actuate the two levers, which are connected by means of a spring, and otherwise operated like the above mentioned levers H' and H². As the ejecting levers W form no part of the present invention further description or illustration thereof is deemed unnecessary.

I do not bind myself to use the rolls M and M' for feeding the sheet into the desired position for detaching the stamps, labels or the like, as in place of these rolls a device based on the parallel-rule motion may be employed, as shown in Figs. 12, 13 and 14; one bar, A², being a fixture on the sheet carrying carriage B, and having two movable bars, B² and C⁸, guided in slots (or by other suitable means), connected to the fixed bar A² by means of springs, C⁴ and C⁵, and distance pieces, C² and C³. A presser foot, C⁹, is connected to the fixed bar A² and another presser foot, C⁷, to the short loose bar B². These presser feet C⁷ and C⁹ have roughened surfaces for gripping the stamps, labels or the like.

The method of feeding the sheet into position for detaching the stamps or the like will be as follows:—The presser foot C⁷ is raised a given distance by means of the lever C⁶, and the foot C⁹ is also raised a given distance, to allow a sheet to be placed thereunder. The long loose bar C⁸ is then pushed forward, which brings the presser foot C⁷ and loose bar B² by means of the springs C⁴ and C⁵ and distance pieces C² and C³ close to the fixed bar A². The sheet is then placed in position under the feet C⁷ and C⁹. The lever C⁶ is then released, which allows the presser foot C⁷ to drop, and by the action of its small springs C' to press upon the surface of the sheet, thus keeping the sheet stationary. Then, by the action of pushing back the carriage B into position for detaching the stamps or the like, the end of the long loose bar C⁸, comes into contact with the end of the frame or a projection thereon, which pushes it back, thus forcing the long loose bar C⁸ (and consequently the loose bar B² and the presser foot C⁷ which are kept close to the long loose bar C⁸ by means of the springs C⁴ and C⁵), toward the vertical stamping rod C, carrying with them the next row of stamps, labels or the like into the position for detaching them.

The method of working the machine as a whole may be briefly recapitulated as follows: A sheet of postage stamps, labels or the like is inserted between the rolls M and M' or beneath the presser feet C⁷ and C⁹, and water or other suitable material is placed in the trough T for moistening the gummed side of the stamps, labels or the like. An operator then presses the vertical stamping rod C down, and by this action a stamp, label or the like is detached or severed from the sheet, and carried downward through the aperture T' in the trough, and attached to the postal or other matter, which is placed in its position under the vertical stamping rod. After the knife or knives F have severed or detached the stamp, label or the like, the rod C regains its position, and by so doing actuates the bolt K which releases the rack L on the carriage B, and this by means of the spring R, brings the next stamp, label or the like into position to be severed by the next depression of the vertical stamping rod, and so on.

Handles can be made of any suitable material for the easier handling of the machine, and a cover can be fixed to the base after the style of a typewriter.

Having now particularly described and ascertained the nature of my said invention and in what manner the same is to be performed, I declare that what I claim is:

1. An improved machine for detaching from the sheet and affixing postage stamps, labels or the like, having, in combination, a vertically reciprocating stamping rod, vertically yielding knives which move by frictional contact with the sides of said rod and normally project at its lower end, and are constructed with vertical slots and horizontal shoulders, headed attaching screws inserted through the slots of said knives into said rod, friction springs interposed between the screw heads and knives, an apertured member constructed and arranged to interact with said shoulders to arrest the downward movement of the knives and to allow the stamping rod to continue its stroke and affix the severed stamp, label or the like; a subjacent support for the matter to be stamped or labeled; and guiding means constructed and arranged to interact with the upper ends of said knives to restore them to their normal positions.

2. An improved machine for detaching from the sheet and affixing postage stamps, labels or the like, having, in combination with fixedly located guiding means, a vertically reciprocating stamping rod, a horizontally movable sheet-supporting table provided with an escapement rack, a propelling spring connected with said table, an escapement bolt interacting with said rack, means for transmitting motion to said bolt from said rod after each stamping operation, a safety pawl interacting with said bolt and said rack at its respective ends, and means for feeding the sheet crosswise on said table to bring another row of stamps or the like into position in line with said rod.

3. An improved machine for detaching from the sheet and affixing postage stamps, labels or the like, having, in combination with fixedly located guiding means, a vertically reciprocating stamping rod, a horizontally movable sheet-supporting table, means for moving said table under the control of said rod after each stamping operation, and means for feeding the sheet crosswise on said table to bring another row of stamps or the like into position in line with said rod, said means for feeding the sheet crosswise including a pair of horizontal feed rolls, a hand crank, and stop gearing transmitting motion from said hand crank to said rolls whereby the rotation of said rolls at each operation is limited to a predetermined extent.

4. An improved machine for detaching from the sheet and affixing postage stamps, labels or the like having, in combination, with fixedly located guiding means, a vertically reciprocating stamping rod, a horizontally movable sheet supporting table provided with an escapement rack, a propelling spring connected with said table, an escapement bolt interacting with said rack, means for transmitting motion to said bolt from said rod after each stamping operation, and means for feeding the sheet crosswise on said table to bring another row of stamps or the like into position in line with said rod, said means for feeding the sheet crosswise including a pair of horizontal feed rolls, a hand crank, and stop gearing transmitting motion from said hand crank to said rolls, whereby the rotation of said rolls at each operation is limited to a predetermined extent, substantially as hereinbefore specified.

Dated this 14th day of May, 1908.

In testimony whereof I affix my signature in the presence of two witnesses.

FREDERICK MEYER.

Witnesses:
 H. D. JAMESON,
 R. WILLIAMS.